US006633459B2

(12) United States Patent
Heim et al.

(10) Patent No.: US 6,633,459 B2
(45) Date of Patent: Oct. 14, 2003

(54) FUNCTIONAL RECORDING-HEAD ON-SLIDER LAP MONITOR

(75) Inventors: Kevin Richard Heim, Eden Prairie, MN (US); Clifton H. Chang, Bloomington, MN (US); Peter Thomas Weyandt, Plymouth, MN (US); Patrick Joseph Ryan, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 186 days.

(21) Appl. No.: 09/883,749

(22) Filed: Jun. 18, 2001

(65) Prior Publication Data

US 2002/0015264 A1 Feb. 7, 2002

Related U.S. Application Data

(60) Provisional application No. 60/213,086, filed on Jun. 20, 2000.

(51) Int. Cl.$^7$ ............... G11B 5/39; G01R 33/12
(52) U.S. Cl. ............... 360/313; 324/211; 360/320; 360/323; 360/319
(58) Field of Search ............... 360/313, 317, 360/319, 320, 323; 324/210, 211, 212

(56) References Cited

U.S. PATENT DOCUMENTS

| | | | |
|---|---|---|---|
| 4,219,853 A | | 8/1980 | Albert et al. |
| 4,912,883 A | | 4/1990 | Chang et al. |
| 5,390,420 A | | 2/1995 | Schultz |
| 5,402,074 A | | 3/1995 | Keel et al. |
| 5,463,805 A | | 11/1995 | Mowry et al. |
| 5,508,614 A | * | 4/1996 | Garfunkel et al. .......... 324/318 |
| 5,514,953 A | | 5/1996 | Schultz et al. |
| 5,559,429 A | | 9/1996 | Mowry et al. |
| 5,566,038 A | | 10/1996 | Keel et al. |
| 5,703,485 A | | 12/1997 | Guo et al. |
| 6,016,692 A | | 1/2000 | Schaenzer et al. |
| 6,097,578 A | | 8/2000 | Pokhil |
| 6,169,646 B1 | | 1/2001 | Macken et al. |
| 6,216,242 B1 | | 4/2001 | Schaenzer |
| 6,445,551 B1 | * | 9/2002 | Asatani et al. ............... 360/317 |
| 6,483,298 B2 | * | 11/2002 | Heim et al. ................. 324/210 |
| 2002/0085318 A1 | * | 7/2002 | Hsiao et al. ................. 360/323 |

FOREIGN PATENT DOCUMENTS

| | | | | | |
|---|---|---|---|---|---|
| JP | 58068219 A | * | 4/1983 | ............ | G11B/5/46 |
| JP | 09081913 A | * | 3/1997 | ............ | G11B/5/39 |
| JP | 09161233 A | * | 6/1997 | ............ | G11B/5/39 |
| JP | 11306519 A | * | 11/1999 | ............ | G11B/5/39 |
| JP | 2000076626 A | * | 3/2000 | ............ | G11B/5/39 |
| JP | 2001084537 A | * | 3/2001 | ............ | G11B/5/39 |
| JP | 2002183914 A | * | 6/2002 | ............ | G11B/5/39 |

* cited by examiner

*Primary Examiner*—William Klimowicz
(74) *Attorney, Agent, or Firm*—Merchant & Gould P.C.

(57) ABSTRACT

The invention is a magnetoresistive recording head including the reader portion that has a top and bottom shield, a first auxiliary electrical connection, a second auxiliary electrical connection, a first auxiliary electrical contact, and a second auxiliary electrical contact, where the first auxiliary electrical connection electrically connects the first auxiliary electrical contact to the top shield, and where the second auxiliary electrical connection electrically connects the second auxiliary electrical contact to the bottom shield. There is also provided a method of determining the electrical integrity of a magnetoresistive recording head that includes fabricating a magnetoresistive recording head including a reader portion having at least one shield, at least one reader contact, that is electrically connected to the reader portion, a shield shunt, at least one auxiliary electrical connection, and at least one auxiliary electrical contact that is electrically connected to at least one of the shields, and measuring the integrity of the magnetoresistive recording head.

16 Claims, 5 Drawing Sheets

FUNCTIONAL RECORDING-HEAD ON-SLIDER LAP MONITOR

This application claims priority to U.S. Provisional Application Ser. No. 60/213,086, filed on Jun. 20, 2000, entitled Functional Recording-Head On-Slider Lap Monitor, the disclosure of which is incorporated by reference herein in its entirety.

FIELD OF THE INVENTION

The invention relates generally to magnetoresistive recording heads for hard disk drives. More specifically, the invention relates to methods and devices for determining the operational and structural integrity of magnetoresistive recording heads.

BACKGROUND OF THE INVENTION

The surface quality of the air-bearing surface, including the reader-to-shield isolation, of a magnetoresistive recording head is of extreme importance to the performance of the head as well as to its projected life expectancy. With recent advances in magnetic data storage, the reader gap thickness in magnetoresistive read/write heads has decreased significantly. This increasingly smaller gap has created a situation where the application of as little as a one or two volt potential difference across the reader and one or more neighboring shields can irreparably damage the recording device.

Currently, there is no fast, accurate method to determine the quality of the finished surface of a recording head that is intended to be used in a hard disk drive. One known method is to obtain electron micrographs of the finished surface. The acquisition of electron micrographs is time consuming and may destroy the head. Further, micrographs do not always provide an accurate representation of the degree of electrical isolation. Hand-probing individual sliders to verify that the isolation is intact can also cause severe damage to the head so that it is no longer useful for a drive. Hand-probing has also become increasingly difficult to perform as the dimensions of the shields have decreased. Both of these currently utilized methods guarantee only partial sampling because of the amount of time required for each test, and the destructive nature of the tests.

Other exemplary methods for finishing recording heads and evaluating integrity include both of Mowry et al., U.S. Pat. Nos. 5,463,805 and 5,559,429, which disclose systems for lapping magnetoresistive sensors. The Mowry et al. processes include simultaneous lapping of a lap monitor and the magnetoresistive sensor to provide the desired resistance. The resistance of the magnetoresistive sensor is set by comparison to a reference resistor in order to provide the target resistance. Chang et al., U.S. Pat. No. 4,912,883 also discloses a lapping control system for thin film magnetic transducers. The Chang et al. system uses the correlation between saturation current and transducer throat height to regulate the termination of lapping. Keel et al., U.S. Pat. No. 5,402,074 discloses an apparatus and process for measuring core-to-coil impedance and integrity of a recording head. The structure of Keel is limited to measurements at wafer level, and cannot be used for measurement at other stages of processing and functioning.

Other methods are also available for evaluating the integrity of head components. For example, Shultz, U.S. Pat. No. 5,390,420 discloses a device and process for determining the alignment between magnetoresistive elements and contacts. Further, Shultz et al., U.S. Pat. No. 5,514,953 discloses a process for measuring differences in magnetic domains among multiple magnetoresistive sensors.

However, even with these processes and devices, there still remains a need for a device and method for measuring the electrical isolation of a magnetic recording head that is nondestructive and that can be used at any point throughout fabrication, testing and use of a magnetoresistive recording head.

SUMMARY OF THE INVENTION

In accordance with one aspect of the invention there is provided a magnetoresistive recording head including a reader portion having at least one shield, at least one reader contact, that is electrically connected to the reader portion, a shield shunt, at least one auxiliary electrical connection, and at least one auxiliary electrical contact that is electrically connected to at least one of the shields.

In accordance with another aspect of the invention there is provided a magnetoresistive recording head including the reader portion that has a top and bottom shield, a first auxiliary electrical connection, a second auxiliary electrical connection, a first auxiliary electrical contact, and a second auxiliary electrical contact, where the first auxiliary electrical connection electrically connects the first auxiliary electrical contact to the top shield, and where the second auxiliary electrical connection electrically connects the second auxiliary electrical contact to the bottom shield.

In accordance with yet another aspect of the invention there is provided a method of determining the electrical integrity of a magnetoresistive recording head that includes fabricating a magnetoresistive recording head including a reader portion having at least one shield, at least one reader contact, that is electrically connected to the reader portion, a shield shunt, at least one auxiliary electrical connection, and at least one auxiliary electrical contact that is electrically connected to at least one of the shields, and measuring the integrity of the magnetoresistive recording head.

A device and method of determining reader-to-shield isolation and the surface quality of a fully functional magnetoresistive recording head are provided. This improvement to the design of a traditional recording head offers the ability to measure the reader-to-shield isolation, capacitance, leakage current, and break-down voltage across the reader gap. The evaluation may be done at wafer-level, slider-level, or HGA-level under the same geometrical conditions as an actual recording head.

Furthermore, the improved head can be used to test, quantify, and improve the lapping process of recording heads in the slider portion of the process. This differs from known methods of using a lap monitor to determine device integrity during the lapping process.

DETAILED DESCRIPTION OF THE PREFERRED EMBODIMENT

Devices in accordance with the invention provide an electrical contact to an otherwise typical magnetoresistive recording head so that reader-to-shield isolation measurements can be performed on actual recording heads intended for use in disk drives with no anticipated negative effects on the heads.

The Device

Figure 1:
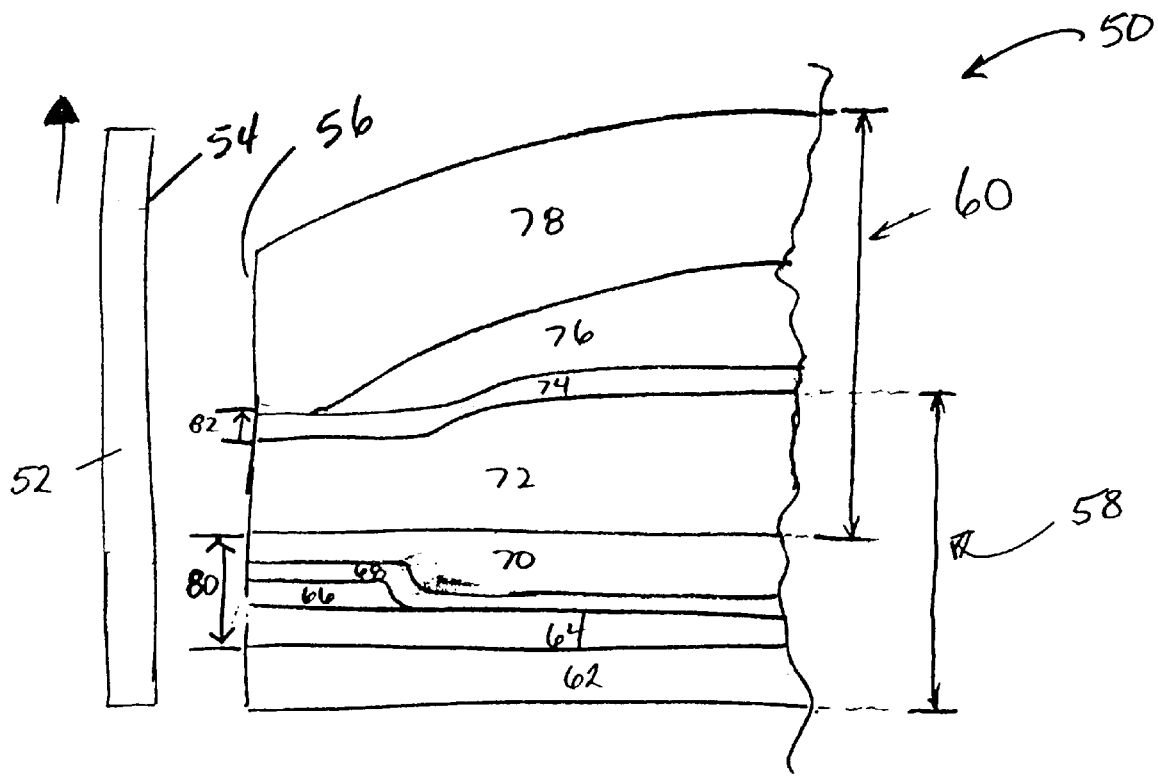
FIG. 1 is a cross sectional view of a magnetic read/write head and a magnetic disc taken along a plane normal to an air bearing surface of the magnetic read/write head.

FIG. 1 is a cross-sectional view of a magnetic read/write head 50 and magnetic disc 52. The figure is taken along a plane normal to the air bearing surface 56 of magnetic disc 52. FIG. 1 illustrates the orientation of magnetic read/write head 50 with respect to magnetic disc 52. In a standard configuration, air bearing surface 56 of magnetic read/write head 50 faces upper disc surface 54 of magnetic disc 52. The direction of rotation of magnetic disc 52 with respect to air bearing surface 56 of magnetic read/write head 50 is given by the arrow in the upper left hand corner. As magnetic read/write technology advances, the distance between air bearing surface 56 of magnetic read/write head 50 and upper disc surface 54 of magnetic disc 52 is becoming increasingly smaller.

FIG. 1 also illustrates part of the structure of magnetic read/write head 50. The reader portion 58 of magnetic read/write head 50 includes bottom shield 62, bottom gap layer 64, read element 66, metal contact 68, top gap layer 70, and top shield or shared pole 72. The read gap 80 of the reader portion 58 of magnetic read/write head 50 is made up of the area between the top of bottom shield 62 and the bottom of top shield or shared pole 72. Therefore, read gap 80 includes bottom gap layer 64, read element 66, metal contact 68, and top gap layer 70.

Generally, a magnetic read/write head 50 also includes writer portion 60. Writer portion 60 includes top shield or shared pole 72, write gap layer 74, polymer layer 76, and top pole 78. The write gap 82 includes the area between the top shield or shared pole 72, and the top pole 78. Therefore write gap 82 includes write gap layer 74. Polymer layer 76 contains electrically conductive coils (not shown) that generate magnetic fields across write gap 82. The number of electrically conductive coils in polymer layer 76 can vary, and the coils may be present in multiple layers.

Figure 2:
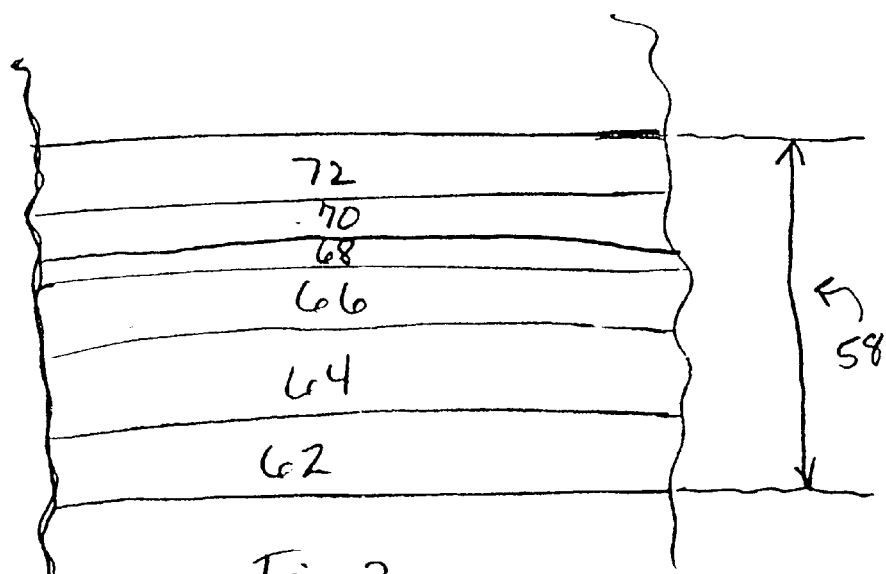
FIG. 2 is a vertical cross-sectional view of an active region of a magnetic read/write head.

FIG. 2 is a vertical cross section of an active region of reader portion 58 of a magnetic read/write head 50. Active region of reader portion 58 exists where read element 66 is not adjacent to metal contact 68. The width of the active region 58 defines the read sensor width.

The layered structure in FIG. 2 theoretically, and preferably provides little to no electrical conductivity between bottom shield 62 and top shield or shared pole 72. Magnetic read/write head 50, in which there is electrical conductivity between the bottom shield 62 and top shield or shared pole 72 are generally considered defective. Defects may occur at the time of fabrication or the head can become defective at some later time.

Devices in accordance with the invention provide for measurement of this conductivity. These devices allow for measurement at virtually any point of fabrication, testing, or use. These devices also can be used as magnetic read/write heads even after testing. Generally, the device of the invention may be manufactured by processes known to those of skill in the art.

Figure 3:
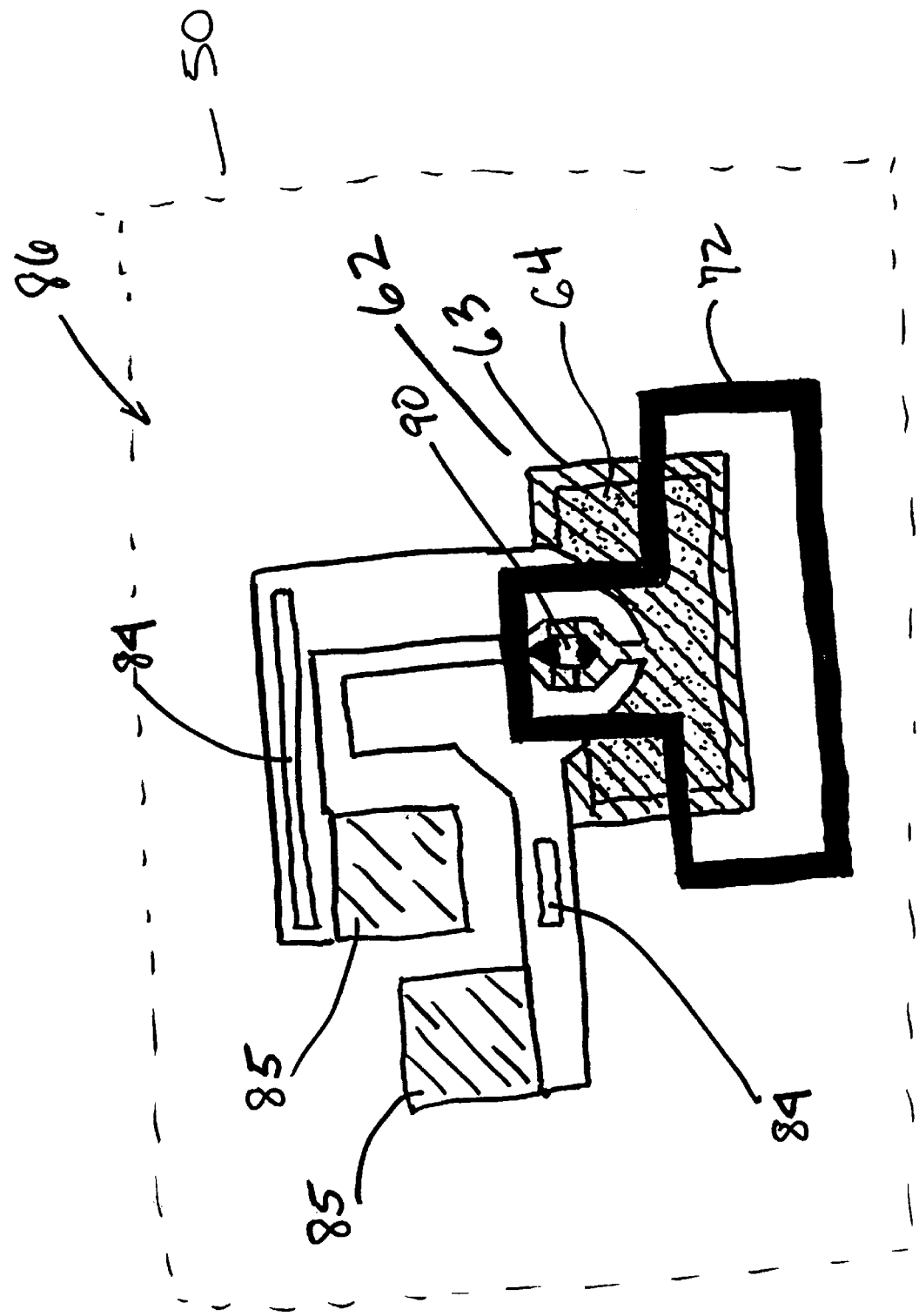
FIG. 3 is a sectional view of a magnetic read-write head taken through various elements of the head to illustrate one embodiment of the inventions.

FIG. 3 depicts a top plan view of a portion of a standard head slider assembly 86. FIG. 3 (as well as FIGS. 4 through 6) does not have all components of a head slider assembly depicted; parts that are unnecessary to explain the invention have not been included for the sake of clarity. Head slider assembly 86 is generally part of magnetic read/write head 50, (FIG. 1), with read electrical extensions 84, and read electrical contacts 85. Read electrical extensions 84 serve to connect read head 50 to read electrical contacts 85. Read electrical contacts 85 function to connect the circuitry of the read head 50 so that the data it reads can be communicated.

Alternatively, head slider assembly 86 can additionally include shield shunt 90. Shield shunt 90 functions to electrically contact bottom shield 62 to top shield or shared pole 72. When shield shunt 90 is present, it generally functions to prevent an excess charge from building up on one of the shields. If there is an excess charge on one of the shields (bottom shield 62 or top shield 72), the reader will malfunction.

Shield shunt 90 may be formed through any number of processes known to those of skill in the art which allow the formation vias and contact materials which lower the lead resistance of the transducer. Lowering the lead resistance, in turn, improves the signal to noise ratio. Vias are formed through the dielectric material that makes up bottom gap layer 64 and top gap layer 70 (FIG. 1), of read/write head 50. A contact layer is then placed within these vias to provide electrical contact between the bottom shield 62 and the top shield 72.

The bottom shield 62 of read/write head 50 may also be modified. One way in which the bottom shield 62 can be modified is to have it be comprised of an inner structure 64 that carries out the function of a standard bottom shield and an outer overcoat layer 63. The outer overcoat layer 63 in this embodiment generally comprises a seed layer. A structure such as that represented by outer overcoat layer 63 and inner structure 64 can be used to decrease unwanted anisotropic effects of the bottom shield 62.

Figure 4:
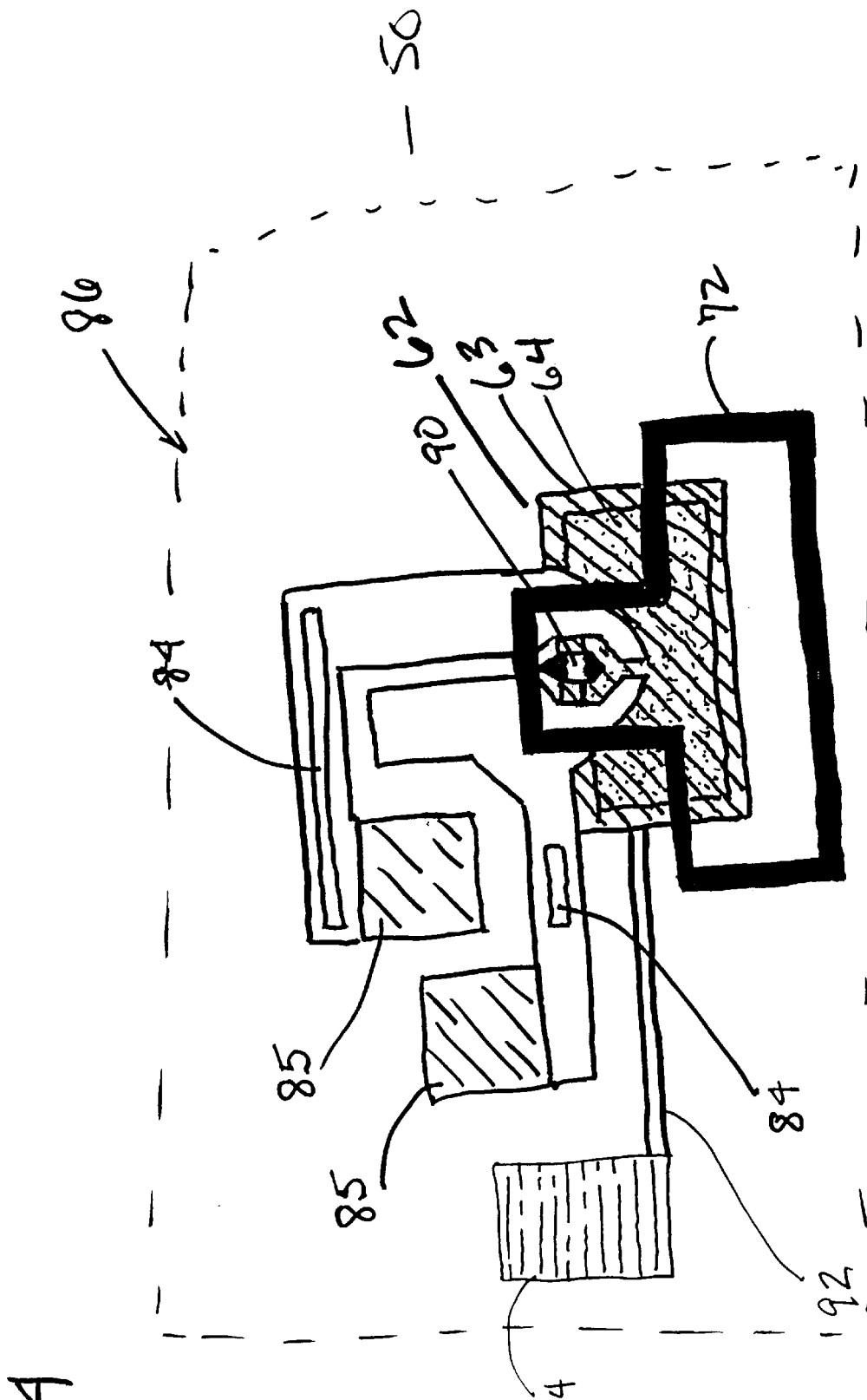
FIG. 4 is a sectional view of a magnetic read-write head taken through various elements of the head to illustrate a further embodiment of the invention.

There are a number of different embodiments of the invention that incorporate a number of the components of read/write head 50 as discussed above. FIG. 4, offers a depiction of one such device in accordance with the invention.

As shown in FIG. 4, another device in accordance with the invention uses read/write head 50, (FIG. 1), comprising read electrical extension 84, read electrical contacts 85, first auxiliary electrical extension 92, and first auxiliary electrical contact 94. In this embodiment, first auxiliary electrical extension 92 serves to electrically connect bottom shield 62 of read/write head 50 with first auxiliary electrical contact 94.

First electrical contact 94 passes through all subsequent non-electrically conducting layers of the supporting structure. First auxiliary electrical contact 94, which is present at the surface of the wafer, is electrically connected to first auxiliary electrical extension 92. First auxiliary electrical extension 92 can generally be positioned anywhere on the wafer surface where there is sufficient space. Preferably, first auxiliary electrical extension 92 is placed so that it can be reached with at least one probe for measuring electrical properties, such as voltage. More preferably, first auxiliary electrical contact 94 is configured so that it is isolated from read electrical contacts 85. This configuration is desirable because a potential difference will be applied across one (or both) read electrical contacts 85 and first auxiliary electrical contact.

First auxiliary electrical extension 92 and first auxiliary electrical contact 94 can generally be fabricated through use of the normal processing flow used for fabricating the head slider assembly 86. First auxiliary electrical extension 92 is preferably fabricated by editing at least one photo mask layer used in the production of the head slider assembly 86. The photo mask layer is modified so that a relatively small electrical path extends from bottom shield 62 of read/write head 50 to just beneath the intended position of first auxiliary electrical contact 94. Preferably, shape anisotropy effects are taken into consideration when constructing first auxiliary electrical extension 92 (and other auxiliary electrical extensions that will be discussed below).

First auxiliary electrical extension 92 can form a contact with the bottom shield 62 as a whole. Alternatively, first auxiliary electrical extension 92 can contact a portion of bottom shield 62 preferentially. For example, if bottom shield 62 has been modified to contain an inner structure 64 with an outer overcoat layer 63, first auxiliary electrical extension 92 can preferentially form an electrical contact to outer overcoat layer 63. This type of contact may be preferred in order to limit otherwise disadvantageous interactions. For example, the outer overcoat layer 63 may be the point of electrical contact which minimizes unwanted anisotropic effects. Any embodiments of the invention, including those discussed herein can take advantage of modifications, such as this modification to the bottom shield 62.

First auxiliary electrical contact 94 may be fabricated through processes known to those of skill in the art at the same time that the other electrical contacts, such as read electrical contacts 85 and write electrical contacts (not shown), are constructed. Gold bond pads may also be fabricated on first auxiliary electrical contact 94 if space allows. However, if space-limitations restrict the size of such bond pads, the bond pads may be reduced in size. Reduced size bond pads can be utilized because the surface area necessary for a probe to make electrical contact is generally not as large as that necessary for actual bonding. If such bond pads, whether full size or of a reduced size, are fabricated, they can generally be produced during the same process step that creates the other bond pads.

In this embodiment of the invention, the electrical isolation of the reader is determined in whole, and it cannot be determined where the isolation problem exists. Therefore, a measurement would evidence a lack of electrical isolation, but would not provide information regarding whether the problem existed at the bottom gap layer 64 or top gap layer 70.

Depending upon the configuration of the first auxiliary electrical extension 92 and first auxiliary electrical contact 94, the first auxiliary electrical contact may be available at all times for testing the integrity of the reader-shield isolation.

Figure 5:
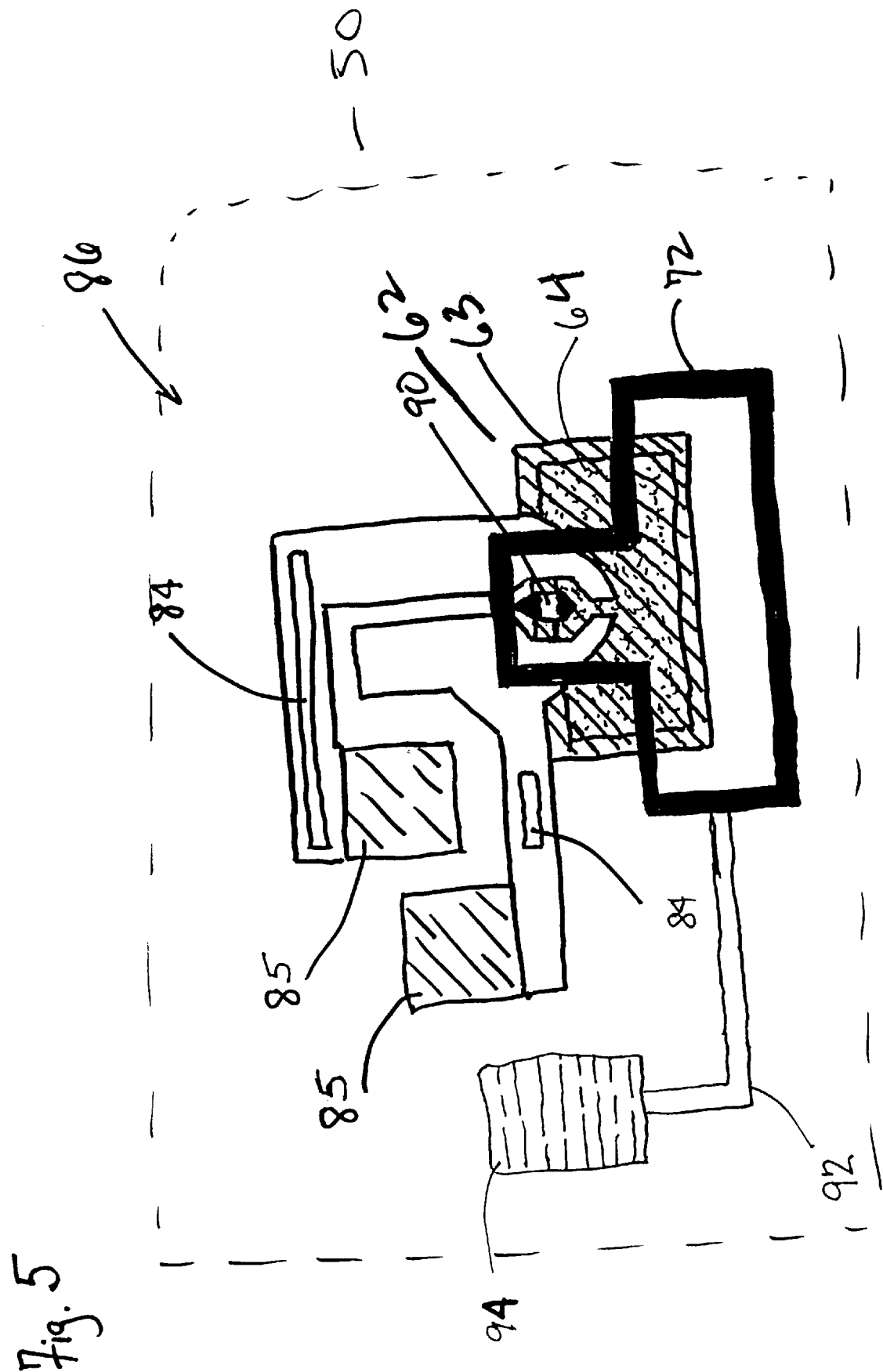
FIG. 5 is a sectional view of a magnetic read-write head taken through various elements of the head to illustrate another further embodiment of the invention.

A further embodiment of the invention may be seen in the device depicted in FIG. 5. First auxiliary electrical extension 92 is connected to the top shield or shared pole 72. This embodiment is fabricated similarly to that depicted in FIG. 4 with modifications based only on geometry. This embodiment also provides the same type of measurement. That is measurement of the overall electrical isolation of the reader, is provided instead of information regarding where the problem resides.

Figure 6:
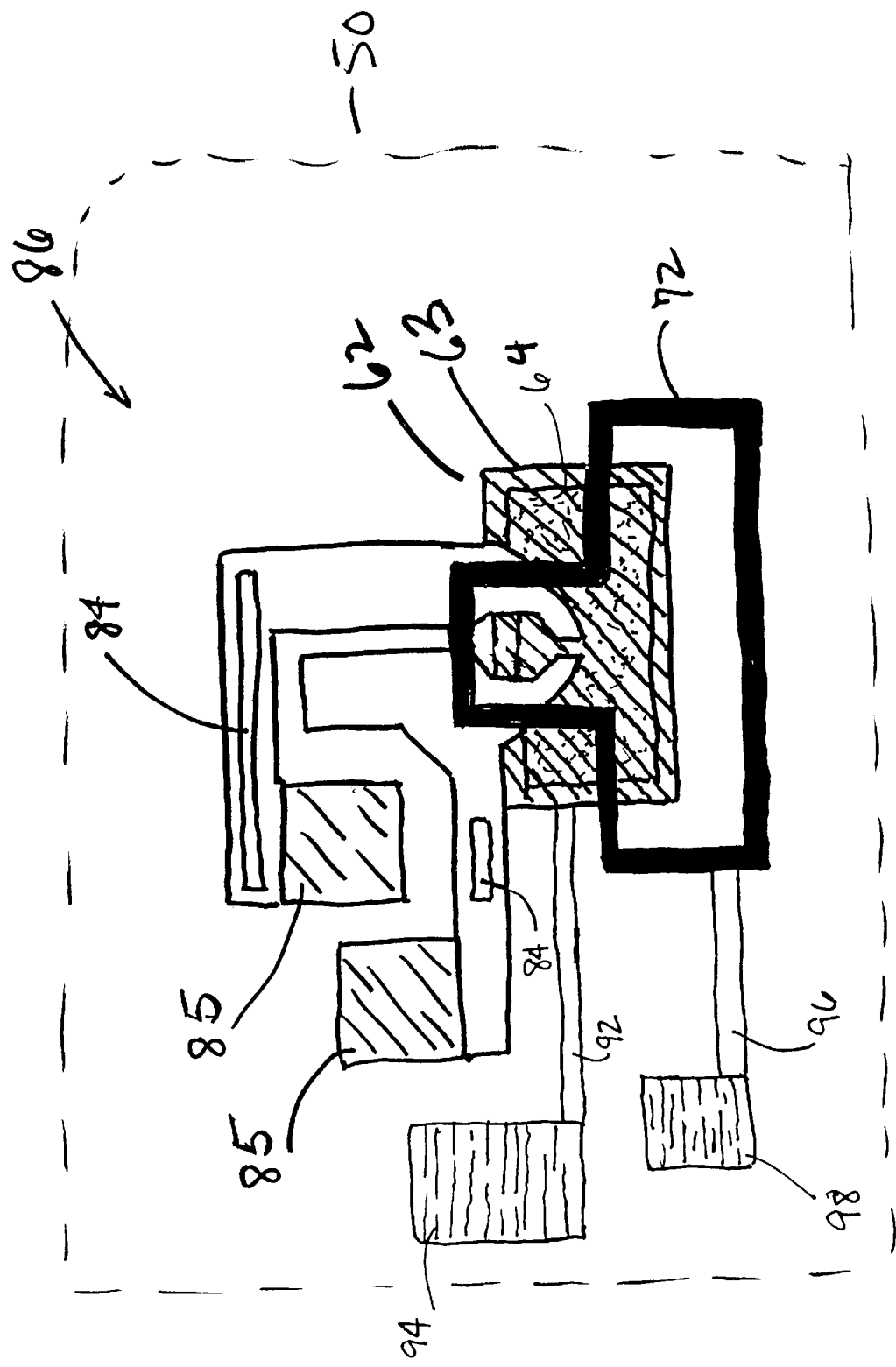
FIG. 6 is also a sectional view of a magnetic read-write head taken through various elements of the head to illustrate an even further embodiment of the invention.

FIG. 6 shows yet another embodiment of the invention. In the embodiment shield shunt 90 is not present. This embodiment of the invention comprises first auxiliary electrical extension 92, first auxiliary electrical contact 94, second auxiliary electrical extension 96 and second auxiliary electrical contact 98. First auxiliary electrical extension 92 serves to electrically connect one of the reader shields, either the bottom shield 62 or the top shield 72, to the first auxiliary electrical contact 94. Second auxiliary electrical extension 96 serves to electrically connect the other reader shield (the one not contacted by the first auxiliary electrical extension 92) to second auxiliary electrical contact 98. Whether the first auxiliary electrical extension 92 contacts the bottom shield 62 or the top shield 72 is irrelevant, as long as the second auxiliary electrical extension 96 contacts the shield not contacted by the first auxiliary electrical extension 92.

The fabrication of this embodiment of the invention can be constructed in a manner similar to the embodiments discussed above. The fabrication can again be integrated into the normal process steps by merely modifying photomask layers. It should also be noted that this embodiment requires two extra contacts on the surface of the wafer.

This embodiment of the invention provides increased versatility and information by allowing measurements to determine which gap layer has failed, that is bottom gap layer 64 or top gap layer 70, FIG. 1. Furthermore, dual measurements using both read electrical contacts 85 in succession affords the opportunity to determine if an isolation event is more frequent on one side of the magnetoresistive sensor than the other. This information could be used to improve the fabrication process of the magnetoresistive recording head.

Operation

Devices, such as those depicted in FIGS. 4 through 6, function to allow measurements to be made related to the quality of the magnetoresistive recording head. The auxiliary electrical connection or connections that are formed in devices of the invention allow a voltage source to be applied between either of the read electrical contacts 85 and the bottom shield 62 and/or the top shield shared pole 72. This creates a voltage difference across the reader gap 80. If the reader gap 80 is not conductively isolated, a current can be measured.

In order to measure the integrity of a magnetoresistive recording head of the invention, a measuring device can be utilized. Examples of measuring devices that can be used in the invention include but are not limited to volt meters, impedance meters, ohm meters, current meters, and capacitance meters among other devices. One example of a measuring device useful with the invention includes a voltage source and a multimeter. Preferably, the voltage source and multimeter are sensitive devices such that electrical currents from nanoamps to milliamps can be measured while a source voltage in the range of 10 millivolts to 50 volts is applied If the voltage is increased and the amount of current passing through the reader gap is measured, the leakage current through the non-conducting gap as well as the overall capacitance of the structure can also be measured. These measurements can be used at water level for a number of quality indicators, such as, to judge the quality of the insulating material, step coverage of the insulating material, and the presence of unintentional conducting spikes which may short circuit the layers, shield, or reader, for example. Process conditions, which may affect the quality of the edge of various layers comprising the structure can also be monitored using devices in accordance with the invention.

At some increased voltage, the device will eventually fail. This could provide a break-down voltage where the device will be permanently destroyed.

Devices of the invention can be used to take measurements throughout the wafer fabrication process as well as subsequent processes in order to determine the electro-static overstress (EOS) or electro-static discharge (ESD) sensitivity of the device as a recording head. Wafer-level tests are conducted at various stages when the devices are being micro-patterned. Slider-level tests are conducted after the wafer is cut into individual pieces (also known as sliders). HGA-level tests are conducted after the sliders are mounted on the head-gimbal assembly (HGA) and/or are being prepared to be installed in a disk drive.

At slider-level and HGA-level, similar reader-to-shield isolation measurements can be performed in order to determine the quality of the slider's air-bearing surface 56. The process by which a recording head is polished includes a rough lap and a final fine lap. The rough lap utilizes free abrasives with a high removal rate such that the resulting surface has a rough surface. The fine lap has a low removal rate and yields a smooth surface. The lapping process has potentially deleterious effects on magnetoresistive recording heads. This may be due to handling, chemical treatment, or materials used. A device in accordance with the invention allows opportunities to monitor and measure the reader-to-shield isolation both during and after the slider-lapping process.

Another advantage of these measurements is that they are made under the same geometrical conditions as an actual recording head. If, for example, during the lapping process the reader-shield smears across the reader gap, the leakage current will rise and thus show evidence of shorting. Similarly, the leakage current could first rise then fall, thus indicating smearing of the shield which eventually cleared or the existence of shield material accumulating on the typically non-conducting abrasive material.

Another failure mode may be incurred during the lapping process where the motion of the abrasive material results in an ESD event thereby permanently shorting or open-circuiting the device where the leakage current signature remains high or first rises and then falls below the typical baseline value, respectively.

Another slider-level measurement could be used to determine the hardness of the finished surface. Such a measurement could serve as an indication of fault-tolerance due to rare head-disk crash events. Two competing recording-head designs virtually identical in all respects except the material used for the reader shields (bottom shield 62 or top shield 72) or reader gap layers (bottom gap layer 64 or top gap layer 70) could be physically stressed by applying a "scratch load". The stressed samples could then be tested using a device of the invention in order to determine the quality of the stressed surface. The recording head design that is more tolerant to the applied load may better tolerate an otherwise unrecoverable head-disk crash.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A magnetoresistive recording head comprising:
   (a) a reader portion, said reader portion comprising a reader element and at least one shield;
   (b) at least one reader contact, said at least one reader contact in electrical connection with said reader element;
   (c) a shield shunt;
   (d) at least one auxiliary electrical connection; and
   (e) at least one auxiliary electrical contact, said auxiliary electrical connection electrically connecting said auxiliary electrical contact to said at least one shield;
   wherein the electrical isolation between said reader element and said at least one shield is determined by applying a voltage to said at least one auxiliary electrical contact and said at least one reader contact whereby the structural integrity of said magnetoresistive recording head is determined.

2. The magnetoresistive recording head of claim 2, wherein said shield is a bottom shield.

3. The magnetoresistive recording head of claim 2, wherein said auxiliary electrical connection electrically connects said auxiliary electrical contact to said bottom shield.

4. The magnetoresistive recording head of claim 1, wherein said shield is a top shield.

5. The magnetoresistive recording head of claim 4, wherein said auxiliary electrical connection electrically connects said auxiliary electrical contact to said top shield.

6. The magnetoresistive recording head of claim 1, wherein said magnetoresistive recording head comprises a bottom shield and a top shield.

7. The magnetoresistive recording head of claim 6, comprising first and second auxiliary electrical connections wherein said first auxiliary electrical connections electrically connects an auxiliary electrical contact to said bottom shield and said second auxiliary electrical connection electrically connects an auxiliary electrical contact to said top shield.

8. The magnetoresistive recording head of claim 1, further comprising at least one bond pad.

9. The magnetoresistive recording head of claim 8, wherein said at least one bond pad is electrically connected to said auxiliary electrical contact.

10. The magnetoresistive recording head of claim 8, wherein said at least one bond pad comprises a metal selected from the group of gold, copper, silver, tin, and mixtures thereof.

11. A magnetoresistive recording head comprising:
    (a) a reader portion, said reader portion comprising a top and a bottom shield and a reader element;
    (b) a first auxiliary electrical connection and a second auxiliary electrical connection; and
    (c) a first auxiliary electrical contact and a second auxiliary electrical contact,
    (d) at least one reader contact, said at least one reader contact being electrically connected to said reader element;
    wherein said first auxiliary electrical connection electrically connects said first auxiliary electrical contact to said top shield, said second auxiliary electrical connection electrically connects said second auxiliary electrical contact to said bottom shield, and the electrical isolation between said reader element and said top or said bottom shield is determined by applying a voltage to said at least one reader contact and said first or second auxiliary electrical contact, respectively, whereby the structural integrity of said magnetoresistive recording head is determined.

12. The magnetoresistive head of claim 11, further comprising at least one bond pad.

13. The magnetoresistive recording head of claim 12, wherein said at least one bond pad is electrically connected to said first auxiliary electrical contact.

14. The magnetoresistive recording head of claim 13, wherein said at least one bond pad is electrically connected to said second auxiliary electrical contact.

15. The magnetoresistive recording head of claim 12, wherein said at least one bond pad comprises a metal selected from the group of gold, copper, silver, tin, and mixtures thereof.

16. A magnetoresistive recording head configured to enable determination of the head's electrical integrity, said magnetoresistive recording head comprising:

(a) reader means comprising at least one shield and a reader element;

(b) contact means electrically connected to said reader element;

(c) shunt means electrically connected to said at least one shield;

(d) auxiliary electrical connection means; and (e) auxiliary electrical contact means electrically connected to said at least one shield by said auxiliary electrical connection means, wherein the electrical isolation between said reader element and said at least one shield is determined by applying a voltage to said at least one auxiliary electrical contact means and said contact means whereby the structural integrity of said magnetoresistive recording head is determined.

* * * * *